United States Patent
Urman et al.

(10) Patent No.: US 7,324,894 B2
(45) Date of Patent: Jan. 29, 2008

(54) ATTITUDE DETECTION METHOD AND APPARATUS FOR INITIAL MOTION CONTROL

(75) Inventors: Robert Urman, Schaumburg, IL (US); James W. Citta, Lombard, IL (US); Warren D. Roddy, Skokie, IL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 646 days.

(21) Appl. No.: 10/823,441

(22) Filed: Apr. 13, 2004

(65) Prior Publication Data

US 2005/0228579 A1  Oct. 13, 2005

(51) Int. Cl.
  G06G 7/48 (2006.01)
  E05F 15/02 (2006.01)
  G06F 17/10 (2006.01)
(52) U.S. Cl. .................. 701/124; 49/31; 49/502; 49/503; 307/10.1
(58) Field of Classification Search ............ 701/124; 49/502–503, 31; 307/10.1; B60J 5/00; H02H 7/085; E05F 15/00
See application file for complete search history.

(56) References Cited

U.S. PATENT DOCUMENTS

| | | | |
|---|---|---|---|
| RE25,748 E * | 3/1965 | Luketa | 43/9.95 |
| 5,069,000 A | 12/1991 | Zuckerman | |
| 6,064,165 A | 5/2000 | Boisvert et al. | |
| 6,178,699 B1 | 1/2001 | Kawanobe et al. | |
| 6,587,046 B2 * | 7/2003 | Joao | 340/539.14 |
| 6,631,384 B1 * | 10/2003 | Richman et al. | 707/104.1 |
| 2002/0121969 A1 * | 9/2002 | Joao | 340/425.5 |
| 2002/0180269 A1 | 12/2002 | Dalakuras et al. | |
| 2003/0016130 A1 * | 1/2003 | Joao | 340/539 |
| 2003/0067541 A1 * | 4/2003 | Joao | 348/148 |
| 2003/0071899 A1 * | 4/2003 | Joao | 348/148 |
| 2003/0193404 A1 * | 10/2003 | Joao | 340/825.71 |
| 2003/0206102 A1 * | 11/2003 | Joao | 340/539.1 |
| 2004/0160319 A1 * | 8/2004 | Joao | 340/539.1 |
| 2005/0228579 A1 * | 10/2005 | Urman et al. | 701/124 |

(Continued)

FOREIGN PATENT DOCUMENTS

JP  2004255905 A  *  9/2004

(Continued)

OTHER PUBLICATIONS

Automotive electronics worldwide—CIRCA 1983, Rivard, J.G.; Haase, R.F.; Vehicular Technology Conference, 1983. 33rd IEEE, vol. 33, May 25-27, 1983 pp. 118-131.*

(Continued)

Primary Examiner—Cuong Nguyen
(74) Attorney, Agent, or Firm—The Webb Law Firm (57) ABSTRACT

An apparatus and method for measuring a directional attitude of a driven load in respect to a level plane is employed to adjust initial driving power requirements in order to overcome the effects of such attitude. The apparatus employs a sensor for measuring the attitude, a processor for comparing the measurement against a threshold and a driver for altering the initial driving power requirements. Additional sensors for measuring shock, vibration, and temperature levels that the load is subjected to prior to the movement may be employed for calibration of the directional attitude measuring sensor or for further adjustment of the initial driving power requirements.

12 Claims, 5 Drawing Sheets

U.S. PATENT DOCUMENTS

2005/0248444 A1* 11/2005 Joao .................. 340/426.13
2005/0264029 A1* 12/2005 Bodner ................ 296/146.8

FOREIGN PATENT DOCUMENTS

WO  WO 2005100064 A1 * 10/2005

OTHER PUBLICATIONS

Applying static WCET analysis to automotive communication software, Byhlin, S.; Ermedahl, A.; Gustafsson, J.; Lisper, B.; Real-Time Systems, 2005. (ECRTS 2005). Proceedings. 17th Euromicro Conference on, Jul. 6-8, 2005 pp. 249-258.*

* cited by examiner

ATTITUDE DETECTION METHOD AND APPARATUS FOR INITIAL MOTION CONTROL

FIELD OF THE INVENTION

The present invention relates, in general, to initial motion control of moving a load over a predetermined path having an attitude and, more particularly, the instant invention relates to initial motion control of a powered door for a vehicle, and yet, more particularly, the present invention relates to initial motion control of a powered door for a transit vehicle door system.

BACKGROUND OF THE INVENTION

The following background information is being provided to assist the reader in understanding the environment in which the invention will typically be used. The terms used herein are not intended to be limited to any particular narrow interpretation unless specifically stated otherwise in this document.

Examples of moving a load over a predetermined path which also varies in a vertical direction, hereinafter referred to as an attitude, include an apparatus for moving a work holding table for metal cutting equipment, a powered apparatus for moving a sliding door of a minivan, a conveyor for moving a load between changing attitude levels, a powered accessibility device for a transit vehicle, and powered door systems for transit vehicles.

In many instances changing attitude levels may affect proper movement of the load if such attitude is not compensated for prior to the load movement. This is particularly the case in a transit vehicle which operates over various terrain attitudes and conditions affecting door operation.

In a first aspect, a vehicle may be stopped on a terrain surface which is graded in a longitudinal direction, hereinafter referred to as a pitched attitude measured by a degree of pitch, affecting opening and closing of the doors that move parallel to the vehicle structure. In such condition, when the door opening movement is toward the rear of the vehicle, the door will tend to open faster and close slower due to its own weight. When the door opening movement is toward the front of the vehicle, the door will tend to open slower and close faster due to its own weight.

In a second aspect, the vehicle may be stopped on a terrain surface which is graded in a lateral direction, hereinafter referred to as a rolled attitude measured by a degree of roll, affecting opening and closing of the doors that move perpendicular to the vehicle structure. In such condition, when the vehicle is rolled toward its side used for passenger ingress and egress, the door will tend to open faster and close slower due to its own weight. On the other hand, when the vehicle is rolled away from its side used for passenger ingress and egress, the door will tend to open slower and close faster due to its own weight.

As would normally be expected, a much more severe condition for movement of the door is encountered when the transit vehicle is stopped on the terrain surface which combines both roll and pitch attitudes.

In a third aspect, if a transit vehicle exhibits higher rolling levels due to lower tire pressure and/or wheel wear, a door of a larger size may obstructed against a stationary object such as a curb or platform.

It is generally well known in the transit vehicle art to employ a door member engageable with a powered door operator and driven thereby to cover and uncover an aperture of the transit vehicle. The door is either attached to a driving means of a stationeryly disposed hanger member to achieve a sliding motion or to a pivotally disposed member to achieve a swinging motion. The powered door operators are either of electric, pneumatic or hydraulic types.

To expedite passenger ingress and egress and minimize a dwell time of the transit vehicle at a stop, door opening and closing time intervals have been aggressively set in a 1 to 5 second range. Opening and closing door movements must be controlled in a manner providing smooth, continuous and accurate motion under all design and operating conditions and without bouncing at either end of the movement. Additionally, in a transit vehicle having a multiplicity of door systems, all doors must open and close, for all practical purposes, within an identical time interval. These requirements are especially challenging to meet with pneumatic type door systems due to inherent system response delays and pressure fluctuations of the air pressure supply.

Accordingly, it will be appreciated that a door control system must attain a certain level of precision in order to meet the aforementioned requirements. Newer pneumatic or hydraulic systems may employ electronically controlled variable valves capable of modulating fluid pressure in order to achieve desired door movement. However, older and less sophisticated hydraulic or pneumatic control systems employ on/off discrete pressure valve controls and thus lack the ability to respond to fluctuating operational parameters.

Newer microprocessor based control systems, especially for electric door operators, employ position feedback mechanisms and execute closed-loop motion control algorithms capable of varying a motion profile over the range of the motion. A commonly employed motion profile is based on the velocity control using a well known trapezoidal profile. Such trapezoidal profile changes velocity in a linear fashion until the target velocity is reached. The profile consists of acceleration phase, constant velocity phase and deceleration phase graphically representing a trapezoid. Closed-loop control systems compare measured output of the system with predetermined values and take corrective actions by varying velocity in order to achieve desired door movement. Such comparison and corrective actions are performed throughout a substantial portion of the door movement, generally after the completion of the acceleration phase.

Alternatively, a position control, a torque control or a current control method may be used for door movement.

U.S. Pat. No. 6,064,165 issued to Boisvert et al teaches a method and apparatus for controlling motion of a motor driven element in a vehicle over a range of motion wherein a sensor continuously measures a motor parameter and each subsequent measurement is compared with the previous one to determine its placement in a predetermined motion range. The values of the threshold parameter range vary with a position of the motor driven element over such range of motion or an elapsed time of movement. A controller coupled to the comparator alters the motion of the driven element if the measured parameter falls outside of the range.

A disadvantage of presently used motion control methods is that the door accelerates and decelerates during the range of the motion to achieve a predetermined motion control profile and complete such motion in a predetermined time interval. Even though door accelerations and decelerations may not be obvious to one observing door motion, they may decrease component durability by diminishing door movement with a constant speed value.

Such an approach further places additional constraints onto an obstruction detection algorithm executed by the control system as it now has to determine whether parameter fluctuations are due to obstruction or are due to other factors such as vehicle attitude described below.

The presently employed control systems lack a capability to recognize abovementioned surface attitudes prior to initiating door movement thus resulting in increased motion corrections during the range of the movement. This further affects the ability of the door to move within a predetermined time interval, especially at the lower end of the range, and additionally affects movement synchronicity of a plurality of doors on the vehicle.

Another long felt need related to door system operation is the ability to recognize shock and vibration levels prior to initiating door movement. Although this is the case in an opening direction, it is especially the case in a closing direction. Such shock and vibration levels increase the initial resistance to movement and further affect timing of the door movement.

As it can be seen from the above discussion, there is a need for door system attitude compensation prior to initiating door movement, especially for door systems that do not employ newer microprocessor controls.

SUMMARY OF THE INVENTION

The present invention overcomes the aforementioned disadvantages of the present control systems by employing an apparatus for measuring a directional attitude of a driven load in respect to a level plane and for subsequently adjusting initial driving power requirements in order to overcome the effects of such directional attitude.

An apparatus for accomplishing this includes at least one sensor capable of measuring directional attitude and providing a proportional signal. The sensor is disposed in a stationery position in respect to such driven load and substantially aligned with an axis of the directional attitude. The operation of the sensor is enabled by a sensor power supply.

The proportional signal is received by a comparator or by a controller processor and is compared against a predetermined threshold defining a level attitude to provide a drive signal.

The drive signal is then received by a driver which provides a control signal upon receiving a command signal initiating load movement. The control signal is used for adjusting the initial driving power requirements to the load drive system.

Additional sensors measuring shock, vibration, speed or temperature may be employed for calibrating directional attitude measurements that are influenced by such factors.

Alternatively, these measurements may be employed independently or in combination with directional attitude measurements for further compensation of the initial driving power requirements.

OBJECTS OF THE INVENTION

It is, therefore, one of the primary objects of the present invention to provide a vehicle attitude detection method and apparatus.

It is another object of the present invention to provide a vehicle attitude detection method and apparatus which operates prior to initiating door movement.

It is a further object of the present invention to provide a vehicle attitude detection method and apparatus capable of detecting a plurality of vehicle attitudes.

It is an additional object of the present invention to provide a vehicle attitude detection method and apparatus for use with pneumatic, hydraulic and electric door systems.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

BRIEF DESCRIPTION OF THE PRESENTLY PREFERRED AND VARIOUS ALTERNATIVE EMBODIMENTS OF THE PRESENT INVENTION

Before describing the invention in detail, the reader is advised that, for the sake of clarity and understanding, identical components having identical functions have been marked where possible with the same reference numerals in each of the Figures provided in this document.

The structure and operation of the present invention will be explained in combination with a powered door for a transit vehicle as use of the present invention in other applications will be obvious to those skilled in the relevant art form.

The reader's attention is directed to FIGS. 1 through 6, illustrating various types of door system geometry for at least partially covering and uncovering an aperture, generally designated 18, of a vehicle, generally designated 10. The reader will apreciate that operation of a sliding door system, generally designated 20, in FIG. 1 will be affected by pitch attitude of the vehicle 10. When the front of the vehicle 10 is raised in a direction 24, a first door 22 of the door system 20 which moves substantially longitudinally within a door pocket 16 disposed between an outer wall 12 and an inner wall 14 will tend to open slower in such direction 24 and close faster in a direction 28. A second door 26 will tend to open faster in a direction 28 and close slower in a direction 24. The reader will further appreciate that the above conditions will apply to a single type door 22, 24 covering portal aperture 18 or to a sliding type door system 20 disposed for movement external to the outer wall 12.

Figures 2, 3, 4:
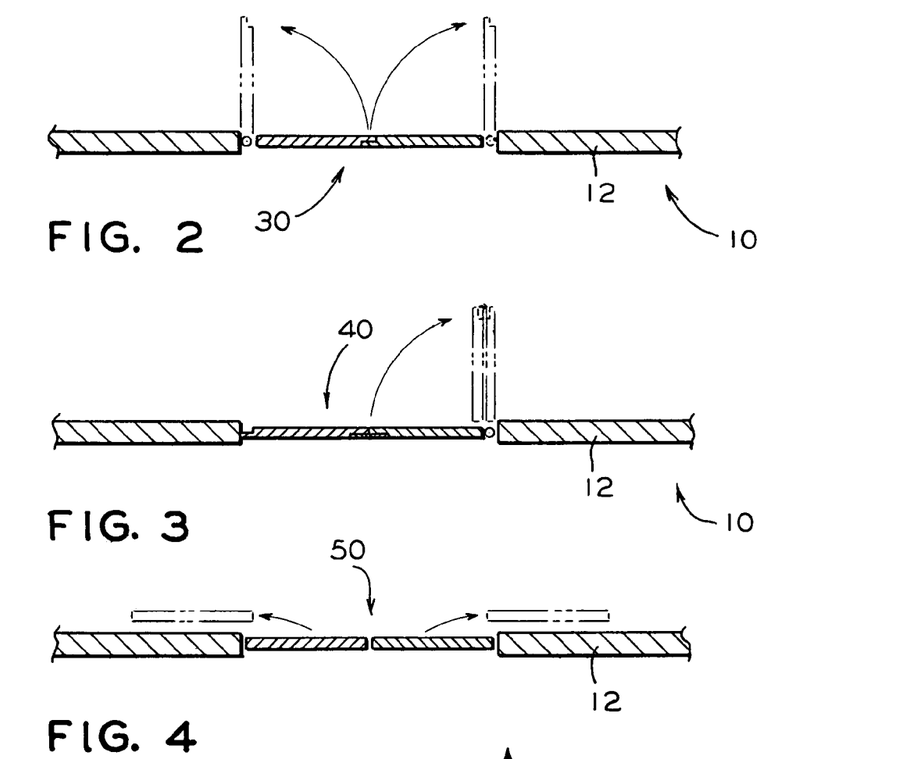
FIG. 2 is a schematic representation of a swinging door type system for a transit vehicle.
FIG. 3 is a schematic representation of a bifold door type system for a transit vehicle.
FIG. 4 is a schematic representation of an outside sliding plug door type system for a transit vehicle.

Operation of a swinging type door system, generally designated 30, in FIG. 2 and a bi-fold type door system, generally designated 40, in FIG. 3 will be affected by the roll attitude of the vehicle 10 as the movement of such swinging door system 30 and bi-fold door system 40 is perpendicular to the wall 12 of the vehicle 10.

Figure 5:
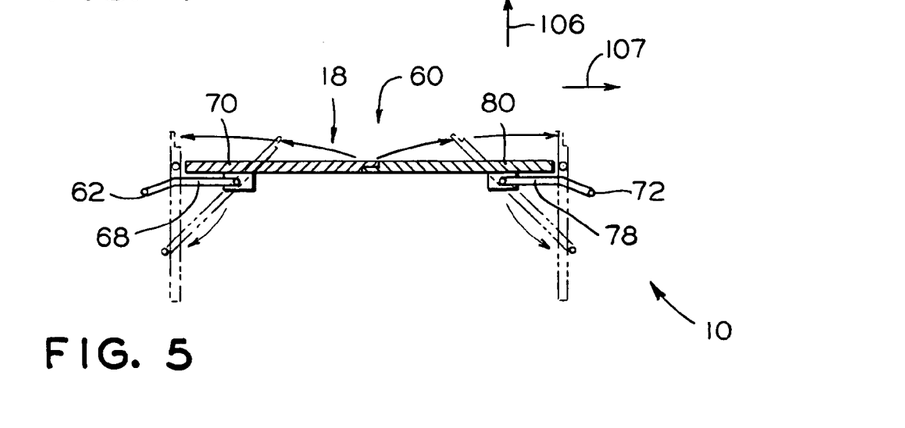
FIG. 5 is a schematic representation of a slide-glide type door system for a transit vehicle.
Figure 6:
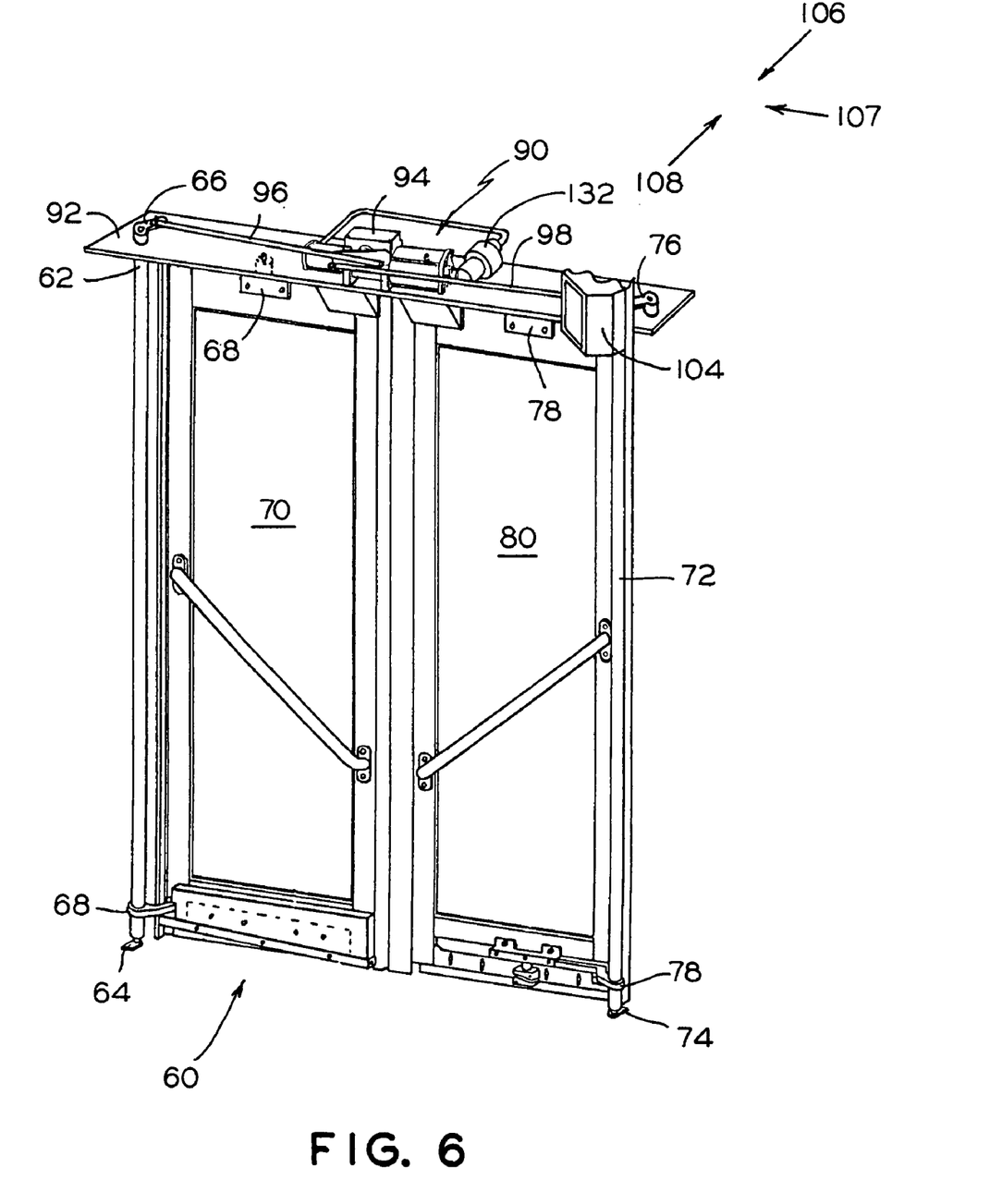
FIG. 6 is a perspective view of a slide-glide type door system for a transit vehicle shown in a substantially closed position.

Operation of an outside sliding plug type door system, generally designated 50, in FIG. 4 and slide-glide type door system, generally designated 60 in FIGS. 5 and 6 will be affected by a combination of pitch and roll attitudes of the vehicle 10 as these door systems move both perpendicular and parallel in respect to the outer wall 12 of the vehicle 10.

The structure and operation of the present invention will be further explained in combination with the slide-glide powered door system 60 for a transit vehicle 10 which is best illustrated in FIGS. 5 and 6 as those skilled in the art will understand applicability of the present invention to other powered door systems.

The slide-glide door system 60 comprises a first door support member 62 pivotally attached to stationery portions of the vehicle 10 at first and second pivots 64 and 66 respectively and coupled to a first door 70 with at least one and preferably a pair of door guides 68.

A second door support member 72 may be pivotally attached to stationery portions of the vehicle 10 at first and second pivots 74 and 76 respectively and coupled to a second door 80 with at least one and preferably a pair of door guides 78. It will be appreciated that both the first door 70 and the second door 80 are disposed within the aperture 18 of the vehicle 10 for at least partially covering thereof and disposed adjacent the aperture 18 for at least partially uncovering thereof to enable passenger ingress and egress.

A door drive means, generally designated 90, is provided for moving the first door 70 and second door 80. Such door drive means 90 generally includes a drive member 94 rigidly attached either directly to the vehicle 10 or to a stationaryly disposed base member 92 which is, in turn, ridgidly attached to the vehicle 10. A first link means 96 and a second link means 98 connect door drive means 90 with the first and second door support members 62 and 72 respectively in order to enable movement thereof and, more particluarly, enable movement of the first door 70 and the second door 80 in a closing and an opening direction. Alternatively, the first link means 96 and second link means 98 may be connected directly to the first door 70 and second door 80 respectively.

It will be appreciated that the door drive means 90 can employ either an electric, a pneumatic or a hydraulic drive member 94 capable of generating a predetermined drive force. In further reference to FIGS. 8 and 9, the pneumatic and hydraulic door drive means 90 further includes at least one control valve means 132 disposed intermediate such door drive means 90 and the power supply source 102. Additionally, a door controller 104 may be provided for both executing a motion control algorithm and for interfacing with the control system 140 of the transit vehicle 10.

Figure 7:
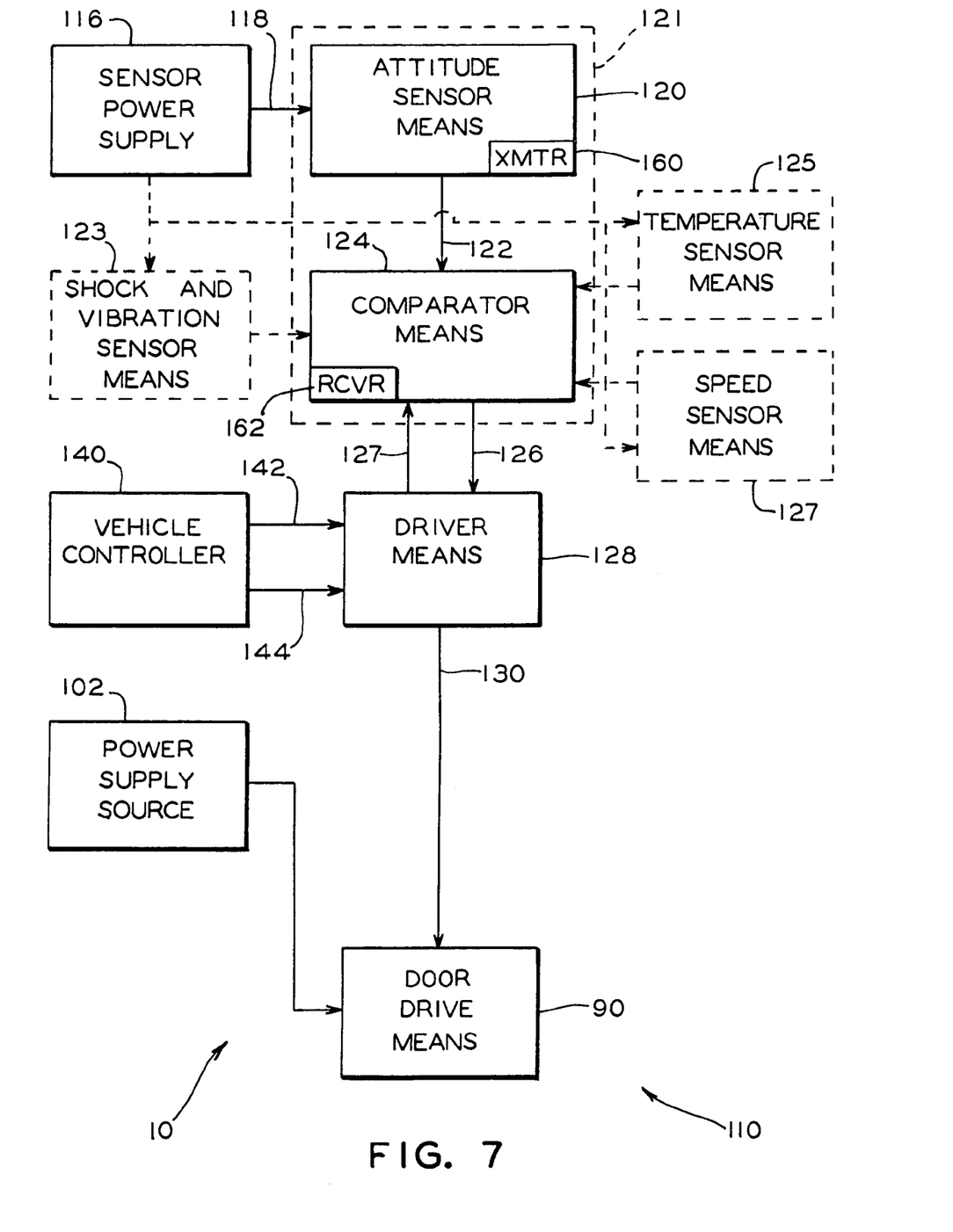
FIG. 7 is a schematic diagram of a first embodiment of the present invention.
Figure 8:
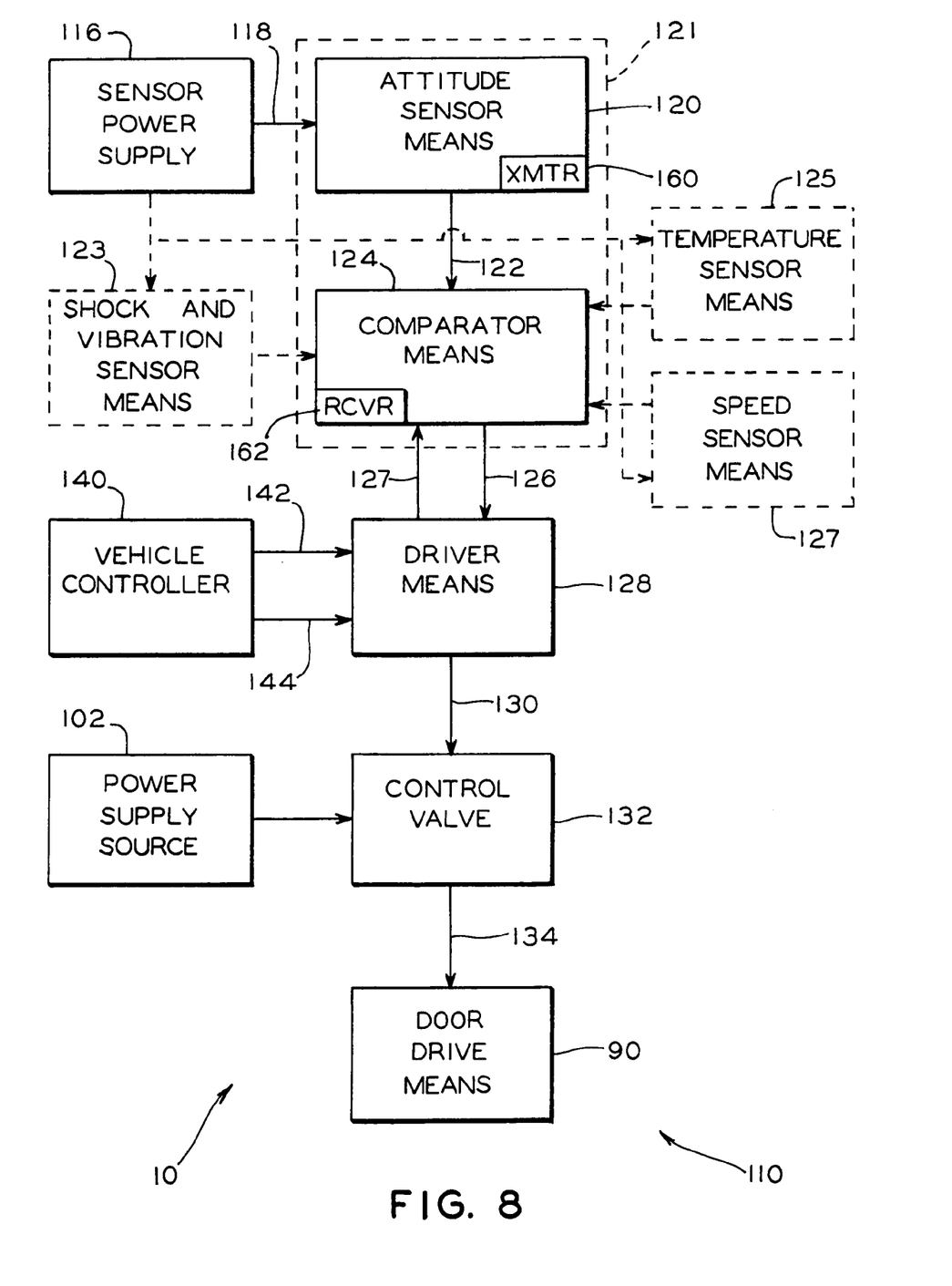
FIG. 8 is a schematic diagram of a second embodiment of the present invention.
Figure 9:
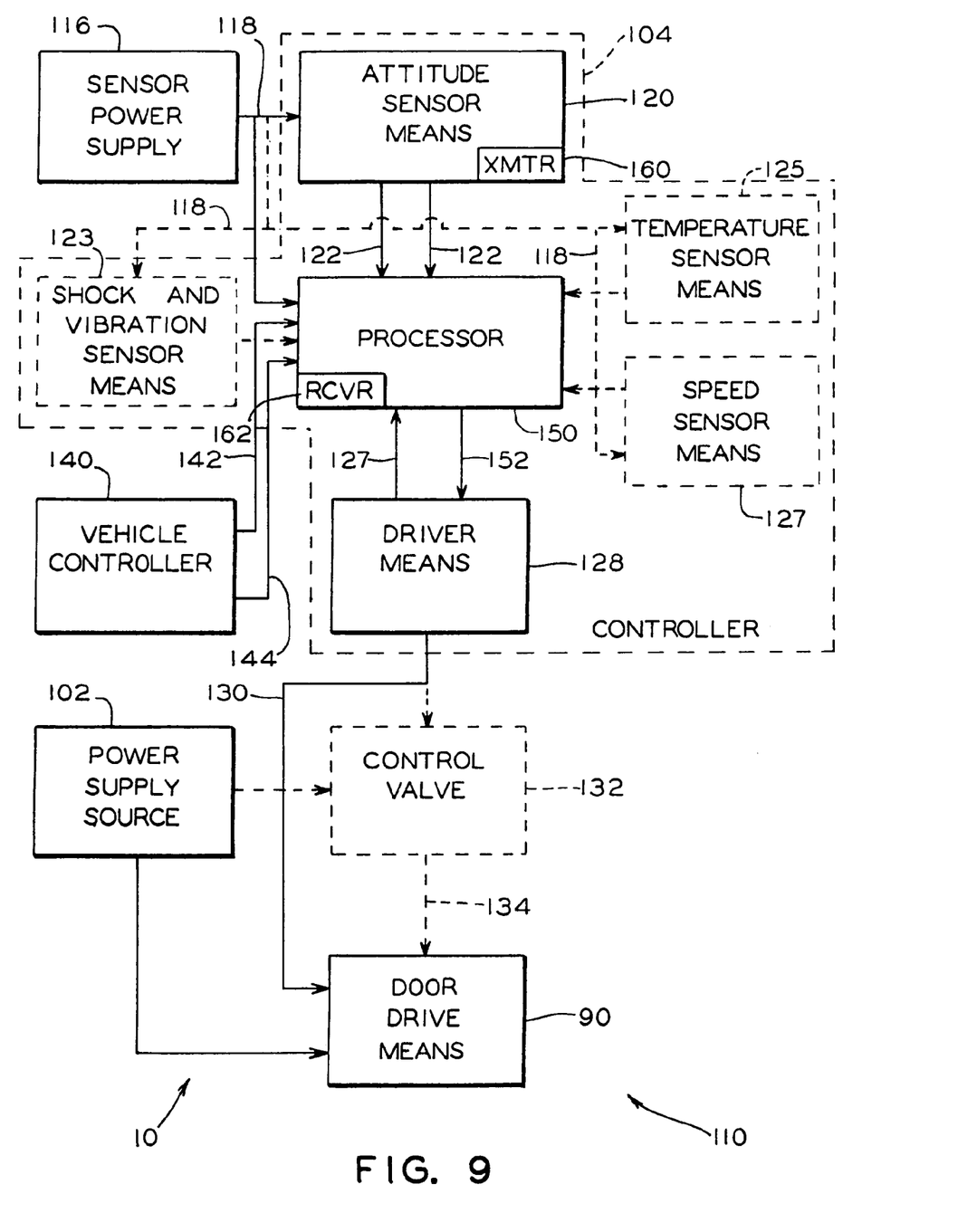
FIG. 9 is a schematic diagram of a presently preferred embodiment of the invention.

The essential element of the present invention is a stationaryly disposed vehicle attitude detection means, generally designated 110, best illustrated in FIGS. 7-9, which measures vehicle attitude values in at least one attitude directional axis and processes such values to adjust at least one level of a power supply source 102 connected to the door drive means 90 prior to moving the first door 70 and the second door 80.

In particular reference to FIG. 7, the attitude detection means 110 includes at least one attitude sensor means 120 aligned with the attitude directional axis 106 or 107. The operation of the at least one attitude sensor means 120 is generally enabled by a sensor power source 116. The at least one attitude sensor means 120 is adapted for measuring a terrain attitude value in a predetermined directional axis 106 or 107 and providing at least one attitude proportional signal 122 to a comparator means 124 which interprets it against a predetemined threshold value which defines a substantially level attitude and is fixed in regards to the door position or movement.

The comparator means 124 then provides at least one drive signal 126 to a driver means 128. The driver means 128 then provides a control output signal 130 of at least one predetermined value to the door drive means 90 which enables first door 70 and the second door 80 to overcome vehicle terrain attitude disposition. The driver means 128 may further provide at least one directional feedback signal 127 to the comparator means 124 enabling thereof to provide a predetermined value of the at least one drive signal 126 proportional to the direciton of door motion.

It will be apreciated that if the vehicle 10 is inclined in a pitch direction 106, as shown in FIG. 6, the second door 80, upon receiving at least one door command signal, which is a door open signal 142 from a vehicle controller 140, will tend to open faster in the direction 106 and therefore the drive signal 126 will enable drive means 128 to issue at least one control output signal 130 of a first predetermined value to enable slower door opening. Upon preferably receiving a second door command signal, which is a door close signal, 144 from vehicle controller 140, the driver means 128 will issue a control output signal 130 of a second predetermined value enabling faster door closing in a direction 108 to overcome gravity factor.

When door drive means 90 is an electrical type, such at least one control output signal 130 may be pulsed with a modulation signal or a current level signal. In applications involving pneumatic or hydraulic door drive means 90, as shown in FIG. 8, such at least one control output signal 130 may enable a control valve means 132 to reduce fluid pressure 134 causing slower door opening and increase fluid pressure 134 causing faster door closing.

Preferably the at least one attitude sensor means 120 and the comparator means 124 are encased within an enclosure 121.

The at least one attitude sensor means 120 can be selected from a group of well known inclinometer technologies including but not limited to an accelerometer, a capacitive tilt sensor, an electrolytic tilt sensor, a gas bubble in liquid, a mercury tilt sensor, and a pendulum which is a rotary shaft encoder coupled to a weight.

The at least one attitude sensor means 120 which is the accelerometer 120 may be selected from a group of well known accelerometer sensor technologies including but not limited to a capacitance, an electromechanical servo, a resonating beam, a piezoelectric, a piezoresistive, a piezo film, a bulk micromachined piezoresistive, a bulk micromachined capacitive, a bulk micromachined resonating beam, and a surface micromachined capacitive.

Those skilled in the art will easily understand that existing door system installations which lack sophisticated door controller 104 can be easily retrofitted with the attitude detection means 110 of the present invention.

In a new door system installation or in those installations which employ a sophisticated microprocessor based door controller 104, such at least one first proportional signal 122 from the at least one attitude sensor means 120 can be received by the processor 150 of the door controller 104 as best shown in FIG. 9. Preferably, a processor 150 is adapted for providing at least one control output signal 152 which is substantially proportional to each incremental value of the at least one attitude proportional signal 122 thus enabling incremental initial control of the door drive means 90.

In the presently most preferred embodiment of the invention, the at least one attitude sensor means 120 is a surface micromachined capacitive multi-axis sensor 120 which is coupled to the processor 150 integral of the door controller 104 which is aligned with each of the attitude directional axis 106 and 107.

Those skilled in the art will readily understand that at least one sensor means 123 may be used to measure shock and vibration parameters acting on the door system 60 during at least deceleration of the vehicle 10. It will be appreciated that if the vehicle 10 failed to reach a complete stop prior to the door system 60 operation, such door system 60 may require increased power supply levels from the power supply source 102 to overcome such vibration during opening.

The door system 60 may further experience vibration if the door closed command 144 has been issued in a close proximity to completion of the opening motion in response to the door open command 142. Additionally, the door system 60 may experience shock if the door close command 144 has been issued prior to completion of the opening motion in response to the door open command 142.

Alternatively, the at least one sensor means 123 measuring shock and vibration may be employed as a calibrating means for at least one attitude sensor means 120 in applications which require a close tolerance control.

Yet in another alternative embodiment, a temperature sensor means 125 may be employed to compensate for temperature effects on such at least one attitude sensor means 120.

In another alternative embodiment, wherein the vehicle 10 failed to reach a complete stop prior to the door system 60 operation, at least one speed sensor means 127 may be adapted for measuring a speed of the vehicle 10 in order to compensate for terrain attitude detection measured by the at least one attitude sensor means 120, which will be generally affected by such speed of the vehicle 10.

In applications requiring the at least one attitude sensor means 120 to be disposed remotely from the door system 60, such at least one attitude sensor means 120 may be adapted with a transmitter 160 cooperating with a receiver 162 connected to the comparator means 124 to enable wireless communication of the measured terrain attitude.

Figure 1:
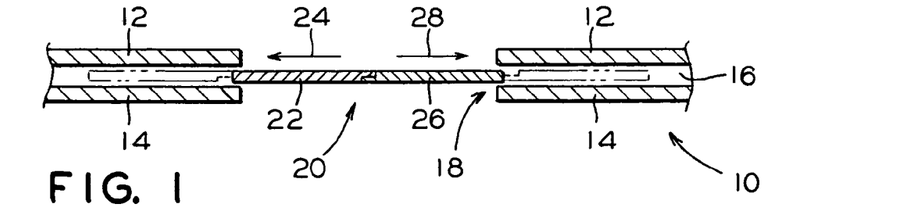
FIG. 1 is a schematic representation of a sliding door type system for a transit vehicle.

In applications involving the sliding door 20 of FIG. 1, the first and second door support members 62 and 72 respectively and drive means 90 will be adapted to enable substantially linear door movement.

In applications involving the outside sliding plug door 50 of FIG. 1, the first and second door support members 62 and 72 respectively and drive means 90 will be additionally adapted to enable a lateral door movement in respect to the outer wall 12 of the vehicle 10.

While the presently preferred and various alternative embodiments of the instant invention have been described in detail above in accordance with the patent statutes, it should be recognized that various other modifications and adaptations of the invention may be made by those persons who are skilled in the relevant art without departing from either the spirit of the invention or the scope of the appended claims.

We claim:

1. A powered door system for enabling passenger ingress and egress through an aperture of a vehicle operating on at least one terrain attitude, said powered door system comprising:

(a) at least one door adapted for movement in a first direction to at least partially uncover such aperture and in a second direction to at least partially cover such aperture;

(b) at least one door support member disposed adjacent such aperture and connected to said at least one door with at least one door guide, said at least one door support member enabling movement of said at least one door in said first and said second directions;

(c) a door drive means disposed adjacent such aperture for driving said at least one door, said door drive means including a drive member rigidly attached to one of such vehicle and a base member attached to such vehicle, said drive member adapted to receive at least one level of a power supply means from a vehicle power supply source and generate a driving force, and at least one link means coupled to said drive member at one end and coupled to one of said door and said door support member for transferring said driving force to said at least one door; and (d) a door controller coupled to said door drive means and a vehicle controller for receiving at least one door command signal, said door controller including at least one attitude sensor means for measuring at least one terrain attitude and providing at least one attitude proportional signal, a processor coupled to said at least one attitude sensor means for receiving said at least one attitude proportional signal and for providing at least one proportional drive signal, and a driver means connected to said processor for receiving said at least one proportional drive signal and for providing at least one control output signal of a predetermined value to such door drive means enabling incremental proportional adjustment of said driving force.

2. In a door system at least partially disposed within an aperture of a vehicle operating on at least one terrain attitude, said door system having at least one door disposed for movement within such aperture for at least partially covering and uncovering thereof a door support means coupled to such at least one door, a door drive means connected to such at least one door for driving thereof, such movement at least partially controlled by an attitude detection apparatus comprising: (a) at least one attitude sensor means disposed in a stationary position in respect to such at least one door and substantially aligned with a directional axis of such at least one terrain attitude, said at least one attitude sensor means for measuring such at least one attitude of such at least one door and for providing at least one attitude proportional signal; (b) a sensor power supply connected to said at least one attitude sensor means enabling operation thereof; (c) a comparator means connected to said at least one attitude sensor means for receiving said at least one attitude proportional signal and comparing it against a predetermined threshold defining a substantially level terrain attitude and for providing at least one drive signal, said predetermined threshold value being fixed with at least one of position and motion of said at least one door; and (d) a means connected to said comparator means for receiving said at least one drive signal and at least one command input signal and for providing at least one control output signal of a predetermined value to such door drive means, said at least one control output signal enabling such door drive means to compensate for such at least one terrain attitude prior to moving such at least one door.

3. The door system according to claim 2 wherein said at least one attitude sensor means is selected from a group of inclinometer technologies consisting of an accelerometer, a capacitive tilt sensor, an electrolytic tilt sensor, a gas bubble, in liquid, a mercury tilt sensor, and a pendulum being a rotary shaft encoder coupled to a weight.

4. The door system according to claim 3 wherein said accelerometer is selected from a group consisting of a capacitive, an electromechanical servo, a resonating beam, a piezoelectric, a piezoresistive, a piezo film, a bulk micromachined piezoresistive, a bulk micromachined capacitive, a bulk micromachined resonating beam, and a surface micromachined capacitive.

5. The door system according to claim 2 wherein said at least one attitude sensor means includes a transmitter for wirelessly transmitting said least one attitude proportional signal.

6. The door system according to claim 2 wherein said driver means provides at least one directional feedback signal for enabling said comparator means to provide a predetermined value of said at least one drive signal proportional to a direction of said door movement.

7. The door system according to claim 2 wherein at least said at least one attitude sensor means and said comparator means are encased within an enclosure.

8. A powered door system according to claim 1 wherein said at least one attitude sensor means is one of a bulk micromachined piezoresistive, a bulk micromachined capacitive, a bulk micromachined resonating beam, and a surface micromachined capacitive.

9. A powered door system according to claim 1 wherein said at least one attitude sensor means is surface micromachined capacitive multi-axis sensor.

10. A powered door system according to claim 1, wherein said powered door system further includes a sensor means for measuring one of vibration, shock, speed and combinations thereof for one of altering said initial movement of said door and calibrating said at least one attitude proportional signal.

11. A powered door system for enabling passenger ingress and egress through an aperture of a vehicle operating on at least one terrain attitude, said powered door system comprising:

(a) a door adapted for movement in a first direction to at least partially uncover such aperture and in a second direction to at least partially cover such aperture;

(b) a door support member disposed adjacent such aperture and connected to said door with at least one door guide, said door support member enabling movement of said door in said first and said second direction;

(c) a door drive means disposed adjacent such aperture for driving said door, said door drive means including a drive member rigidly attached to one of such vehicle and a door support member attached to such vehicle, said drive member adapted to receive at least one level of a power supply means from a vehicle power supply source and generate a driving force, and at least one link means coupled to said drive member at one end and coupled to one of said door and said door support member for transferring said driving force to said door; and (d) a means engageable with said door drive means for measuring such at least one terrain attitude, for providing at least one attitude proportional signal and enabling adjustment of said at least one level of a power supply means to compensate for such at least one terrain attitude prior to said door movement in one of said first and said second directions, said means being disposed in a stationary position and substantially aligned with a directional axis of such at least one terrain attitude.

12. The powered door system according to claim 11 wherein said drive member of said door drive means is an electric drive member receiving at least one control output signal being one of pulsed with a modulation and current level signal.

* * * * *